(12) United States Patent
Voorhies et al.

(10) Patent No.: US 11,185,987 B2
(45) Date of Patent: Nov. 30, 2021

(54) ISOLATED AND ENVIRONMENTAL ANOMALY DETECTION AND CORRECTION USING A DISTRIBUTED SET OF ROBOTS

(71) Applicant: inVia Robotics, Inc., Westlake Village, CA (US)

(72) Inventors: Randolph Charles Voorhies, Sherman Oaks, CA (US); Daniel Frank Parks, II, Los Angeles, CA (US); Lior Elazary, Agoura Hills, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 257 days.

(21) Appl. No.: 16/395,947

(22) Filed: Apr. 26, 2019

(65) Prior Publication Data
US 2020/0338741 A1 Oct. 29, 2020

(51) Int. Cl.
*B25J 9/16* (2006.01)
*B25J 5/00* (2006.01)
*G01C 25/00* (2006.01)

(52) U.S. Cl.
CPC .............. *B25J 9/1692* (2013.01); *B25J 5/007* (2013.01); *B25J 9/1664* (2013.01); *G01C 25/00* (2013.01)

(58) Field of Classification Search
CPC ...... B25J 9/1692; B25J 9/1664; B25J 9/1679; B25J 9/1684; B25J 5/007; G01C 25/00
See application file for complete search history.

(56) References Cited

U.S. PATENT DOCUMENTS

| | | | |
|---|---|---|---|
| 2005/0273198 A1* | 12/2005 | Bischoff | B25J 9/1682 700/248 |
| 2013/0211766 A1* | 8/2013 | Rosenberg | G01B 21/16 702/97 |
| 2013/0331988 A1* | 12/2013 | Goel | G05D 1/0268 700/254 |
| 2017/0183047 A1* | 6/2017 | Takagi | B62D 57/032 |
| 2017/0225336 A1* | 8/2017 | Deyle | G08B 13/196 |
| 2018/0009108 A1* | 1/2018 | Yamamoto | G01C 21/206 |

* cited by examiner

*Primary Examiner* — Khoi H Tran
*Assistant Examiner* — Nhi Q Bui
(74) *Attorney, Agent, or Firm* — Ansari Katiraei LLP; Arman Katiraei; Sadiq Ansari

(57) ABSTRACT

Provided are robots that autonomously detect and correct individualized anomalies resulting from deviations in the sensors and/or actuators of individual robots, and environmental anomalies resulting from deviations in the environment elements that the robots rely on or use in the execution of different tasks. To do so, a robot may receive a task, may determine expected kinematics that include expected activations of a set of sensors and actuators by which the robot executes the task, may activate the set of sensors and actuators according to the expected kinematics, may track the actual kinematics resulting from activating the set of sensors and actuators according to the expected kinematics and continuing the activations until detecting one or more environment elements signaling completion of the task, and may adjust one or more sensors, actuators, or environment elements in response to the actual kinematics deviating from the expected kinematics.

20 Claims, 8 Drawing Sheets

US 11,185,987 B2

ISOLATED AND ENVIRONMENTAL ANOMALY DETECTION AND CORRECTION USING A DISTRIBUTED SET OF ROBOTS

BACKGROUND INFORMATION

Autonomous robots may control their movements and operation in three-dimensional space according to calibrated sensors, calibrated actuators, and/or environment elements. The sensors may use the environment elements as reference points to control the movements of the actuators and/or interactions with other objects in the three-dimensional space. If any of the relied upon sensors, actuators, or environment elements change from an expected state, the movements and/or operation of the robot may be affected.

For instance, if the diameter of a tire used by a robot decreases as a result of wear, then each rotation of the corresponding wheel may cover less distance than expected and/or computed by the robot. Consequently, when the robot computes movements to reach a destination based on a calibrated distance covered by each wheel revolution and/or calibrated operation of other actuators controlling the robot's wheels, the robot may arrive at a location other than the destination. The difference in the end location may be due to the difference in actual movement resulting from each rotation of the worn and smaller tire versus the expected movement computed for each rotation of a calibrated tire with a larger diameter. The differences between the expected movement and the actual movement can lead to a cascade of errors. For instance, the robot may be misaligned by one or more inches with an object at the expected location that the robot attempts to retrieve. As a result of the misalignment, the robot may retrieve the wrong object, or may damage the object during retrieval.

Similarly, if the position of a sensor used by the robot to detect environment elements changes after the sensor is calibrated, the operation of the robot may again be affected. For instance, a camera may move out of position due to vibrations from movements or operations of the robot over time. A misaligned camera may cause the robot to misalign itself in the performance of other tasks. Once again, the misalignment can lead to a cascade of errors or may impact subsequent operations of the robot.

Deviations in the sensors and/or actuators of different robots may occur as a result of ordinary operation of the robots, or because of slight differences during manufacturing. For instance, a one-degree difference in the placement of a camera on one robot versus another robot could cause the robots to operate differently over time despite the robots having the same hardware and receiving the same instructions, commands, or controls.

Errors can also be caused by changing the environment elements that the robots rely upon for movement, operation, and/or task execution. For instance, a human may move an object so that it is not at an expected location. Accordingly, when a robot correctly arrives at the expected location, the robot may experience an error because the object is misplaced. For instance, the robot may be unable to retrieve the object because of the change to that environment element.

Changes to the environment elements may complicate troubleshooting efforts by creating confusion as to the source of an error. It may be difficult to determine whether a robot is failing because of an internal sensor or actuator that is malfunctioning or miscalibrated, or whether the robot is operating correctly but cannot complete an operation or task because of a changed environment element.

DETAILED DESCRIPTION OF PREFERRED EMBODIMENTS

Figure 1:
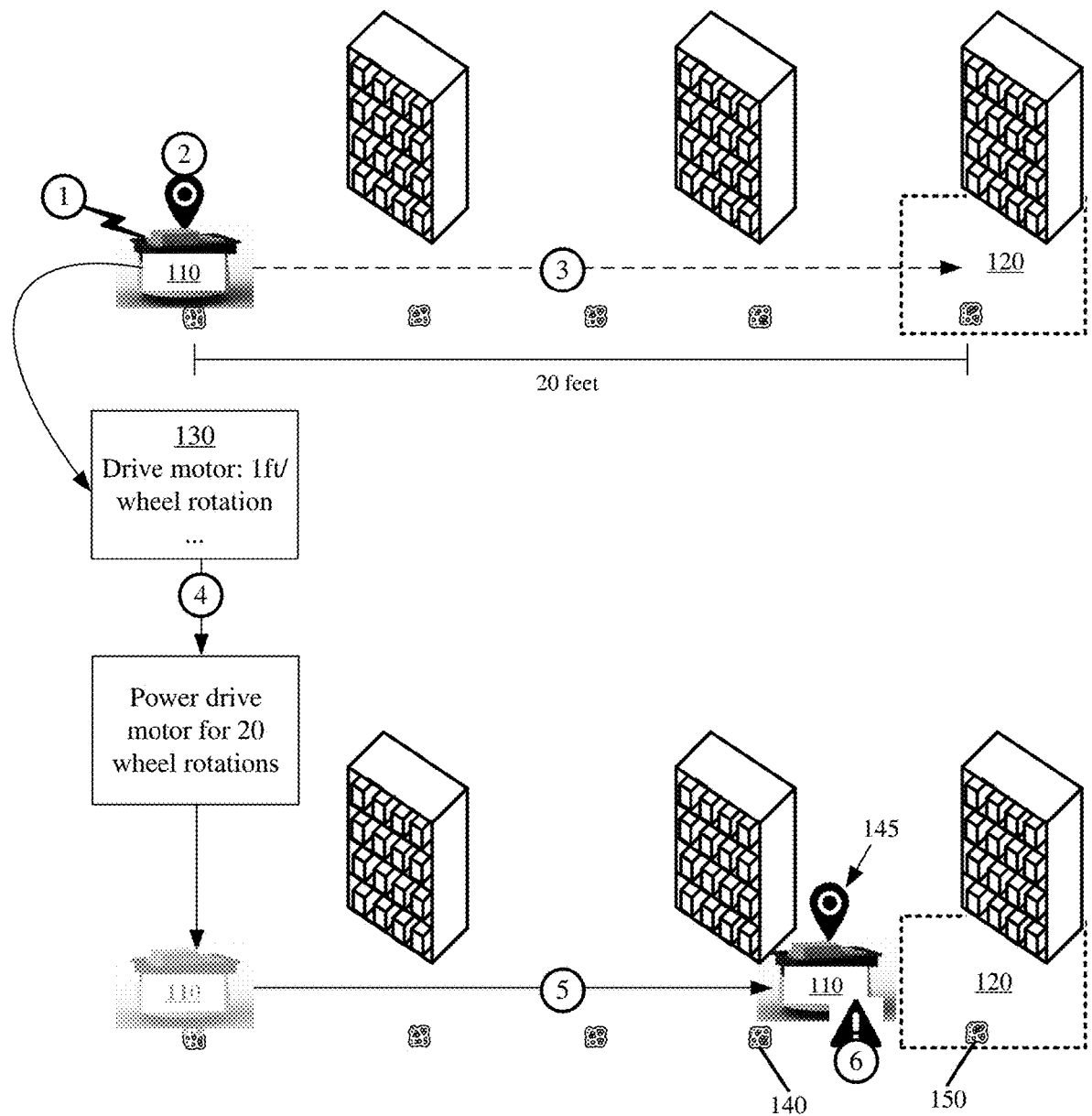
FIG. 1 illustrates an example of autonomously detecting an anomaly based on the kinematics of a robot in accordance with some embodiments described herein.

The following detailed description refers to the accompanying drawings. The same reference numbers in different drawings may identify the same or similar elements.

Systems and methods, as described herein, provide a distributed set of robots for autonomously detecting and correcting anomalies that affect the operation of the robots. The autonomous anomaly detection may include using the distributed set of robots to differentiate between individualized anomalies that affect the movement and operation of individual robots as a result of deviations in the sensors and/or actuators of those individual robots, and environmental anomalies that may affect the set of robots as a result of deviations in the environment elements that the set of robots rely on or use in the execution of different tasks. In other words, the distributed set of robots may determine, without human interaction or involvement, if a particular robot is operating unexpectedly because of an individualized anomaly, or if the distributed set of robots operates unexpectedly because of anomalies with respect to one or more environment elements that may impact the collective set of distributed robots. The autonomous anomaly correction may include a particular robot adjusting one or more of its sensors and/or actuators to correct for a deviation that leads to unexpected operation resulting from an individualized anomaly. The autonomous anomaly correction may also include one or more robots adjusting one or more environment elements to correct for a deviation that leads to unexpected operation resulting from an environmental anomaly.

In some embodiments, the autonomous anomaly detection may include tracking the expected and actual kinematics of each robot from the distributed set of robots as the robots plan and execute various operations. The autonomous anomaly detection may detect anomalies based on a comparison of the expected kinematics, that a particular robot computes for execution of a task, to the actual kinematics, that result from the particular robot executing the task. The autonomous anomaly detection may differentiate between individualized anomalies and environmental anomalies based on a comparison of the tracked expected and/or actual kinematics from two or more robots. The comparison may be based on the expected and/or actual kinematics of two or more robots executing the same or similar tasks, and/or two or more robots that rely on or use the same environment elements in the execution of one or more tasks.

The expected kinematics may be derived based on a calibrated, configured, or current state of a robot's sensors and actuators. The calibrated, configured, or current state defines expected operation of each sensor or actuator. Accordingly, in response to a robot receiving a task, the robot may determine a set of sensors and actuators to use in completing the task, and may further determine a set of commands and controls to complete the task based on the expected operation of the sensors and actuators. In other words, the expected kinematics may define expected movements and operations that should result from activating and/or controlling the sensors and actuators of the robot in a defined manner.

The actual kinematics are the actual movements and operations that result from activating and/or controlling the sensors and actuators of the robot in the manner defined by the expected kinematics. In other words, the expected kinematics are the expected movements and operations that a particular actuator is to produce in response to a set of commands, whereas the actual kinematics are the actual movements and operations that the particular actuator produces in the response to the set of commands.

In some embodiments, the actual kinematics of a robot may be tracked using one or more of the robot's sensors, robot's actuators, and environment elements relied on or used by the robot during the execution of one or more operations or tasks. For instance, a robot may include an accelerometer, an inertial sensor, speedometer, a wheel encoder, a power sensor, a camera, Laser Imaging Detection and Ranging ("LIDAR"), a geolocation sensor, and/or other sensors that may track movements and operation of the robot. The sensor output used to track the actual kinematics may be referenced against or based on one or more environment elements.

The expected kinematics may match the actual kinematics when the robot operates as expected, and the expected and actual kinematics can be matched and/or verified using sensors, actuators, and/or environment elements. An anomaly may occur when there is a discrepancy, mismatch, or some deviation between the expected kinematics that are computed to complete a task, and the actual kinematics required to complete the task. The anomaly may indicate that the robot is not performing as expected or is unable to complete a task in an expected manner due to a deviation in a sensor, actuator, or environment element relied on or used by the robot in the execution of that task.

FIG. 1 illustrates an example of autonomously detecting an anomaly based on the kinematics of robot 110 in accordance with some embodiments described herein. Robot 110 may detect the anomaly in the performance of a task.

As shown in FIG. 1, robot 110 may receive (at 1) an instruction to move to destination 120. Robot 110 may determine (at 2) its current location based on prior movements and/or one or more environment elements. For instance, robot 110 may scan or image a reference marker, fiducial, or other identifier that is an environment element for location in order to determine its current location.

Robot 110 may generate (at 3) a set of operations with which to reach destination 120 from its current location. For instance, as shown in FIG. 1, robot 110 may determine, based on its current location and a map of the operating environment, that robot 110 needs to travel straight for 20 feet to arrive at destination 120. Accordingly, the set of operations for robot 110 to execute include moving in a straight path for 20 feet.

Robot 110 may select a set of sensors and actuators of robot 110 to use in reaching destination 120, and may determine (at 4), based on the generated set of operations and expected kinematics 130 of the selected set of sensors and actuators, an expected set of sensor and actuator activations and controls for robot 110 to complete the set of operations and reach destination 120. For instance, expected kinematics 130 for sensors and actuators of robot 110 may specify that the drive motor of robot 110 is expected to produce 1 foot of lateral displacement or movement for each wheel rotation. Accordingly, the expected set of sensor and actuator activations and controls may include powering the drive motor for 20 wheel rotations in order to produce an expected movement of 20 feet for reaching destination 120.

Robot 110 may activate and control the drive motor according to expected kinematics 130 and the determined (at 4) expected set of sensor and actuator activations and controls. Accordingly, robot 110 may move (at 5) for 20 wheel rotations.

Robot 110 uses one or more sensors to determine that, after the 20 wheel rotations, it has not arrived at destination 120. For instance, robot 110 may use a camera or scanner to scan environment element 140 as it passes environment element 140 to determine that robot 110 has moved closer to destination 120, but has not yet reached destination 120 identified by environment element 150. Alternatively, robot 110 may use a camera to scan objects at its new location, and may determine that an object that is expected at destination 120 (e.g., environment element 150) is not present. Robot 110 may also use a geolocation sensor to determine that coordinates 145 for robot's new location is mismatched with the coordinates of destination 120. In any case, robot 110 uses one or more of its sensors and/or one or more environment elements to track the actual kinematics resulting from the expected set of sensor and actuator activations and controls (e.g., 20 wheel rotations).

Robot 110 determines that the actual kinematics do not match the expected kinematics. Specifically, robot 110 determines that the actual operation of robot 110 based on the expected set of sensor and actuator activations and controls is different than the expected operation because the expected operation was to move robot 110 to destination 120, but the actual operation moved robot 110 to a different location. In FIG. 1, robot 110 may expect that each wheel rotation results in 1 foot of movement based on expected kinematics 130, but the actual movement generated by each wheel rotation is some distance less than 1 foot of movement.

Other examples of deviating kinematics may include expecting a lift of robot 110 to rise by a particular distance in response to powering the lift with a specific voltage and/or current for a period of time, and determining that the lift rose some distance that is more or less than the particular distance as a result of powering the lift with the specific voltage and/or current for the period of time. Another example of deviating kinematics may include turning robot 110 by an expected number of degrees in response to reducing power (e.g., voltage and/or current) to one drive motor and increasing power to another drive motor for a period of time, and determining that robot 110 turned some amount that is more or less than the expected number of degrees. In any case, the deviation in kinematics may result because the calculated or predicted movements or operations, that should occur in response to control or activation input that is provided to one or more actuators of robot 110, differ from the actual movements or operations, that are performed by the one or more actuators in response to the control or activation input. Consequently, robot 110 may detect (at 6) an anomaly.

The detected anomaly may be specific to robot 110. For instance, the detected anomaly may be an individualized anomaly occurring because of one or more sensors or actuators that robot 110 uses to reach destination 120 having changed or deviated from expected operation. Accordingly, the individualized anomaly may only affect robot 110 and not other robots operating in the same environment.

Figure 2:
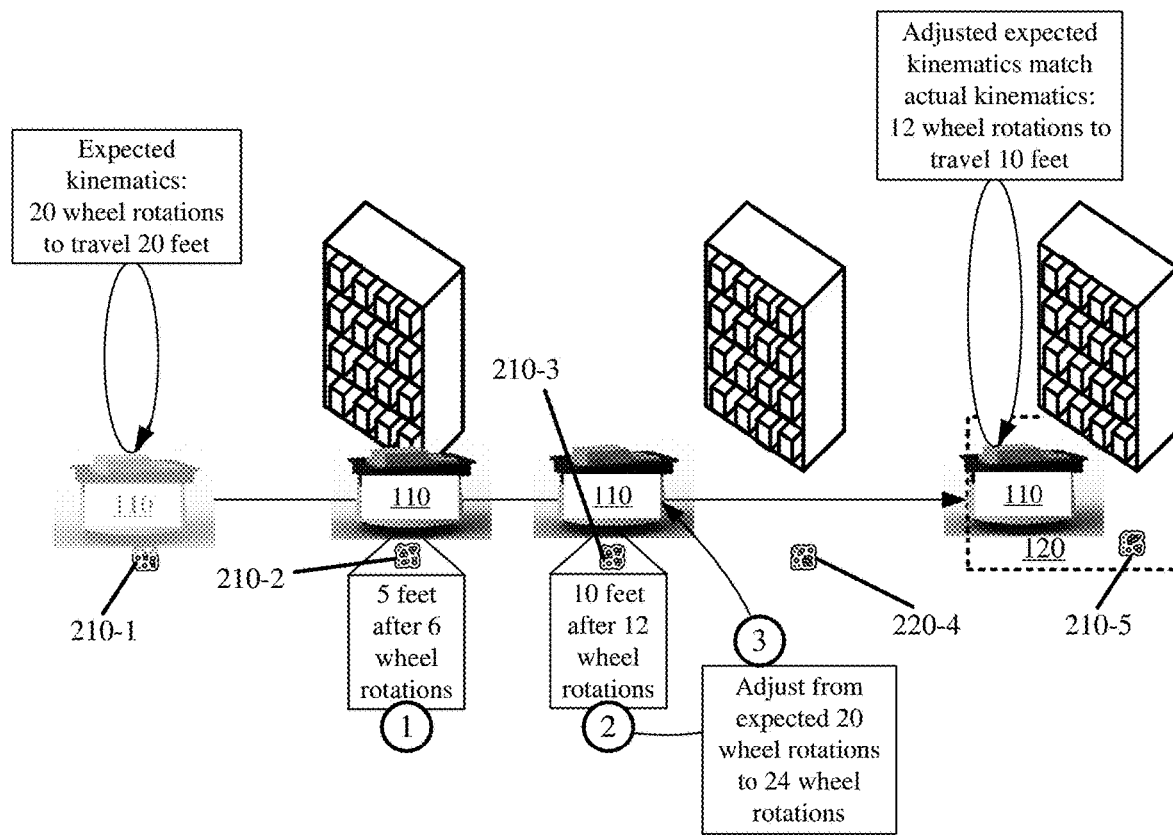
FIG. 2 illustrates an example of a robot self-correcting an individualized anomaly in accordance with some embodiments described herein.

FIG. 2 illustrates an example of robot 110 self-correcting an individualized anomaly in accordance with some embodiments described herein. Robot 110 may perform the self-correcting in response to detecting a deviation between the expected kinematics and the actual kinematics of robot 110 in the performance of a task. The self-correction may involve robot 110 autonomously adjusting one or more sensors and/or actuators of robot 110 that produced the individualized anomaly.

As shown in FIG. 2, robot 110 may track (at 1 and 2) the actual kinematics based on sensor output and one or more environment elements 210-1, 210-2, 210-3, 210-4, and 210-5 (herein sometimes collectively referred to as "environment elements 210" or individually as "environment element 210"). For instance, in FIG. 2, the environment in which robot 110 operates may place each environment element 210 5 feet apart from a next environment element 210. Each environment element 210 may be a fiducial, marker, or other identifier that specifies or encodes a particular location, coordinates, relative position, or other positional information. Robot 110 may travel over, parallel, perpendicular, or in some manner by which a sensor (e.g., a camera) of robot 110 may detect environment elements 210 during execution of the expected set of sensor and actuator activations and controls.

By comparing the expected kinematics to the actual kinematics, robot 110 may determine actuator and/or sensor adjustments that are needed to autonomously and dynamically correct for an individualized anomaly that affects robot 110 and not other robots. For instance, and as shown in FIG. 2, robot 110 may detect that the actual kinematics from 10 wheel rotations do not produce the expected kinematics for traveling 10 feet (e.g., 1 foot per wheel rotation), because robot 110 did not detect a new environment element 210 (e.g., spaced 5 feet apart) after 5 and 10 wheel rotations, or because it took more than 5 wheel rotations to travel from a last environment element 210 to a next environment element 210. Tracking (at 1 and 2) the actual kinematics may reveal that robot 110 used 12 wheel rotations to travel the 10 feet from an initial position to a position identified by environment element 210-3.

The deviation between the expected kinematics and the actual kinematics may be due to components, actuators, and/or sensors of robot 110. For instance, the difference between the expected distance traveled and the actual distance traveled for each wheel rotation may be due to wear, calibration deviations, or other changes to the tires, drive motor, wheel encoder, power regulator providing power to the drive motor, or other actuators or sensors of robot 110.

In some embodiments, robot 110 may isolate the anomaly to a particular sensor or actuator, by using other sensors or actuators to verify output and identify the particular sensor or actuator with unexpected behavior. For instance, robot 110 may confirm that it is traveling 5 feet for every 6 wheel rotations based on output from two different sensors such that the accuracy of any one sensor is not an issue.

In some embodiments, robot 110 may isolate the anomaly to a particular sensor or actuator based on a probabilistic model that is created for each sensor and actuator of robot 110. The probabilistic model may provide different probabilities of a particular sensor or actuator failing. The probabilistic models may be based on manufacturing tolerances, testing, historical performance, age, and/or other parameters of each sensor or actuator. For instance, testing may reveal that a first actuator may deviate from its expected kinematics 5% of the time after the actuator has been in use for one year, and may deviate from its expected kinematics 25% of the time after the actuator has been in use for two years. Manufacturing tolerances may specify that a first sensor used to verify operation of the first actuator may deviate from its expected kinematics 15% of the time because manual installation of the first sensor results in the first sensor being misaligned 15% of the time. These probabilistic models may identify the first sensor of robot 110 as a more likely cause of an anomaly resulting from using the first sensor and the first actuator when the first actuator of robot 110 is less than a year old, and may identify the first sensor of robot 110 as a more likely cause of the anomaly when the first actuator of root 110 is more than three years old.

After isolating an anomaly to a particular sensor or actuator, robot 110 may adjust that particular sensor or actuator. For instance, robot 110 may determine that an anomaly is due to decreased diameter of a tire of robot 110. Accordingly, robot 110 may adjust the number of wheel rotations needed to travel a certain distance according to the decreased diameter of the tire.

In some embodiments, robot 110 may perform the self-correction without having to isolate the anomaly to one or more specific sensors or actuators. In some embodiments, robot 110 may simply adjust operation of the one or more sensors and/or actuators that were used when the anomaly was detected. For instance, from the difference between the expected kinematics and actual kinematics in FIG. 2, robot 110 may determine that each wheel rotation, tracked via the actual kinematics, produces 10 inches of movement (e.g., 5 feet/6 rotations) instead of the expected 12 inches of movement (e.g., 5 feet/5 rotations) defined by the expected kinematics. Robot 110 may then self-correct (at 3) for the detected anomaly based on the deviations between the expected and actual kinematics. For instance, robot 110 may increase the time that power is provided to the drive motor in order to travel 20 feet to destination 120. More specifically, robot 110 may change from the expected set of sensor and actuator activations and controls of 20 wheel rotations to adjusted sensor and actuator activations and controls of 24 wheel rotations.

As another example, robot 110 may determine that a power regulator is incorrectly reporting the power that is provided to the drive motor, and may adjust the power regulator output accordingly. As yet another example, robot 110 may determine that a wheel encoder is incorrectly measuring a full rotation of the wheels, and may adjust the output of the wheel encoder accordingly. These and other anomalies may be detected by using different sensors to verify actual kinematics of a single actuator, or may be based on the probabilistic models of each sensor and actuator.

The self-correction reconfigures or recalibrates robot 110 on-the-fly as robot 110 progresses through executing the set of operations associated with a current task. The self-correction may also change the expected kinematics for future operations performed by robot 110. For instance, in response to the self-correction performed (at 3) in FIG. 2, the expected kinematics to travel the remaining 10 feet to destination 120 may change so that the expected movements or operations to travel the remaining 10 feet define activating and/or controlling the drive motor of robot 110 for 12 wheel rotations, instead of the previous 10 rotations.

Robot 110 may confirm that the detected anomaly has been corrected as a result of comparing the adjusted expected kinematics to the tracked actual kinematics after the adjustments have been made. As shown in FIG. 2, robot 110 correctly travels the remaining 10 feet to destination 120 as a result of activating and/or controlling the actuators of robot 110 according to the adjusted expected kinematics that were derived from adjusting the operation of the drive motors, other actuators, and/or sensors of robot 110. In other words, after adjusting the sensors or actuators of robot 110, the expected kinematics determined that 12 wheel rotations were needed to travel the remaining 10 feet, and the actual kinematics measured after performing the 12 wheel rotations indicate that robot 110 did travel the remaining 10 feet. The adjusted expected kinematics therefore match the tracked actual kinematics for the last 10 feet of travel. Accordingly, robot 110 may determine that the self-correcting adjustments successfully resolved the detected anomaly, and that the anomaly was an individualized anomaly affecting robot 110.

The expected and actual kinematics relative to the wheel rotations are used for explanatory purposes and to simplify the discussion. In some embodiments, the kinematics may be defined differently or more granularly. For instance, rather than compute the number of wheel rotations that are needed to travel a given distance, robot 110 may select the one or more sensors and actuators that are associated with movement, and may compute the amount of power, duration to power, and/or other commands to activate and/or control the selected sensors and actuators to produce the expected movement. Accordingly, the kinematics can be defined based on the sensor or actuator activations and controls, or at a higher level based on desired movements and operations provided by the sensors or actuators.

In some embodiments, the anomaly detected by robot 110 may not be specific or unique to robot 110. Any changes made to the sensors or actuators of robot 110 to remediate such an anomaly would be inconsequential as the changes would cause robot 110 to operate incorrectly at other locations, and would therefore have to be reversed before leading to a cascade of other errors. Moreover, other robots would be affected by the same anomaly. In some such embodiments, an environmental anomaly that affects all robots operating in the same space may be the result of a change to one or more of the environment elements relied on or used by the robots while executing different operations or performed different tasks.

An example of an environmental anomaly may include adjusting the position of one of environment elements 210 of FIG. 2 such that two or more neighboring environment elements 210 are no longer equally separated (e.g., 5 feet apart) as is expected by robots 110. For example, environment element 210-3 may be placed 7 feet away from environment element 210-2 such that the mismatch in the expected kinematics and actual kinematics of robot 110 is not due the drive motor, other actuator, or sensor of robot 110 operating unexpectedly. In this case, the 10 wheel rotations of robot 110 may correctly move robot 110 10 feet from its initial position, and the 5 five feet of distance from environment element 210-2. However, since robot 110 does not detect environment element 210-3 at the expected location (e.g., 5 feet from environment element 210-2 since environment element 210-3 is unexpectedly 7 feet from environment element 210-2), robot 110 may detect an anomaly, and may make adjustments to its sensors and actuators that cause robot 110 to travel past environment element 210-4 and/or environment element 210-5 identifying destination 120. Consequently, robot 110 may have to readjust the sensors and actuators based on overshooting environment element 210-4 or environment element 210-5 because of the adjustments made due to the environmental anomaly resulting from incorrect placement of environment element 210-3.

Accordingly, the systems and methods, set forth herein, allow the robots to differentiate between individualized anomalies and environmental anomalies by using collective swarm detection to detect environmental anomalies that affect two or more different robots. In particular, the robots may obtain and compare kinematics and anomalies shared between the robots in order to detect if an anomaly is specific to a single robot and is representative of an individualized anomaly, or is one that affects multiple robots and is representative of an environmental anomaly.

In some embodiments, each robot may wirelessly transmit a detected anomaly along with the expected and actual kinematics associated with that detected anomaly to each of the other robots, that operate in the same space, via messages directly addressed to each robot or via a broadcast or multicast transmission that all robots may receive. In some other embodiments, each robot may wirelessly transmit a detected anomaly along with the expected and actual kinematics associated with that detected anomaly to a central coordinator, and the central coordinator may aggregate the anomalies to detect the same environmental anomalies that affect two or more robots.

In some embodiments, the robots may also share, with each other or with the central coordinator, expected and actual kinematics from completed operations or executed tasks. In some such embodiments, the shared kinematics for successfully completed operations or executed tasks can serve as a baseline for determining if an anomaly is individualized or environmental.

By comparing the anomalies and kinematics of other robots, the central coordinator or the robots, in a distributed manner, may differentiate between individualized anomalies and environmental anomalies. More specifically, if two or more robots experience the same anomaly at the same location or during execution of the same movement or operation, or if two or more robots have the same or similar deviations between their expected kinematics and their actual kinematics, the central coordinator or the robots may classify the anomaly as an environmental anomaly.

In response to detecting an environmental anomaly, the central coordinator or detecting robot may provide information about the environmental anomaly to other robots. The robots may avoid self-correcting for a detected environmental anomaly. One or more robots may then be tasked with correcting the environment element that was changed and that led to that environmental anomaly.

Figure 3:
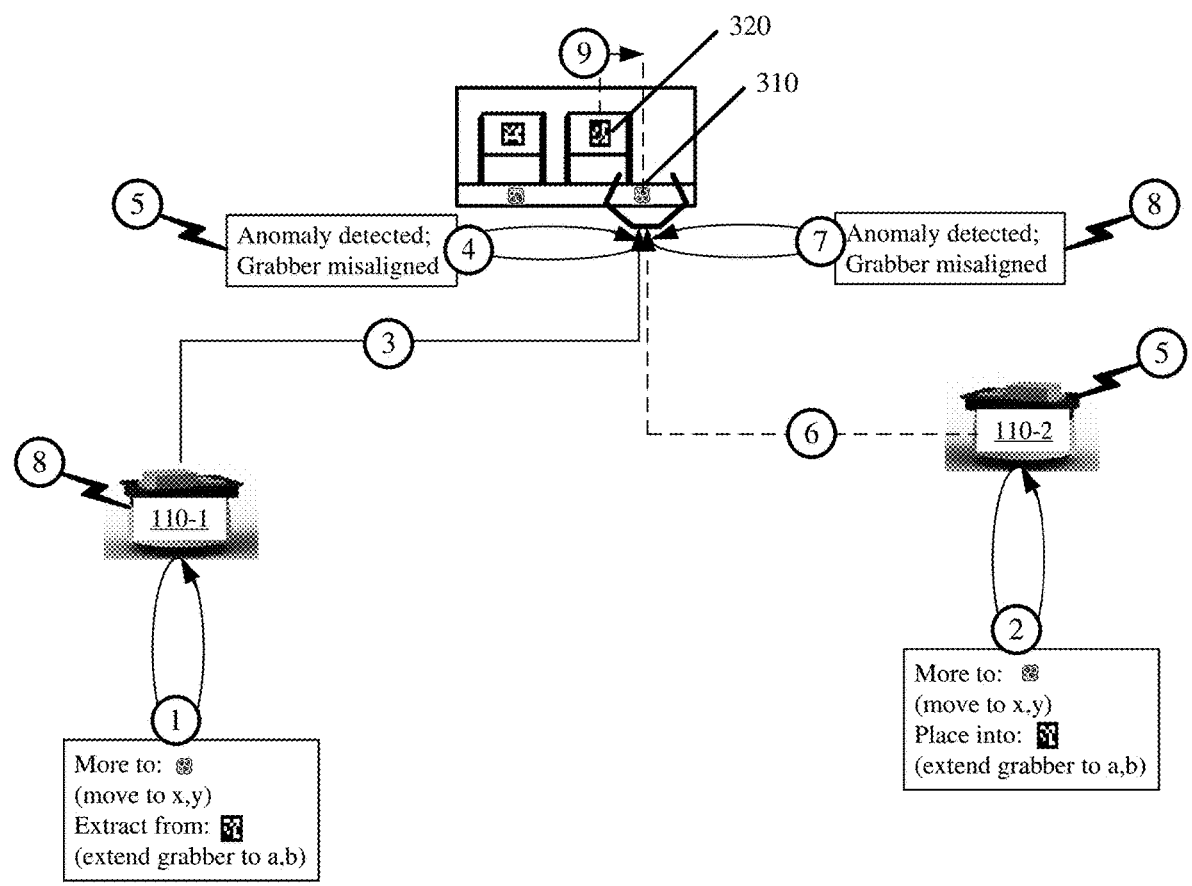
FIG. 3 illustrates an example of using two or more robots to detect an environmental anomaly in accordance with some embodiments described herein.

FIG. 3 illustrates an example of using two or more robots to detect an environmental anomaly in accordance with some embodiments described herein. As shown in FIG. 3, two robots 110-1 and 110-2 (herein sometimes collectively referred to as "robots 110" or individually as "robot 110") rely on environment elements 310 and 320 in performing the same or similar tasks at different times.

Environment element 310 may be a first fiducial or first identifier indicating an expected position of a particular object. Environment element 320 may a second fiducial or second identifier of the particular object.

In FIG. 3, both robots 110-1 and 110-2 may be tasked with interacting with the particular object. For instance, robot 110-1 may be instructed (at 1) to retrieve one or more items from the particular object, and robot 110-2 may be instructed (at 2) to place one or more items in the particular object or to relocate the particular object. In any case, both robots 110-1 and 110-2 may experience an error and detect an anomaly when relying on environment elements 310 and 320.

The anomaly may be due to second environment element 320 being misaligned with first environment element 310 as a result of the particular object having moved, shifted, or misplaced because of a prior human or robot interaction with the particular object. The anomaly may also be due to second environment element 320 being misaligned with first environment element 310 as a result of improper placement or shifting of second environment element 320.

Consequently, when robots 110 move to (at 3 and 6) and correctly align themselves with first environment element 310, robots 110 do not detect (at 4 and 7) the particular object or cannot correctly interact with the particular object because of the misalignment between second environment element 320 and first environment element 310. For instance, robots 110 may perform an off-center retrieval of the particular object that could damage or lead to an improper retrieval of the particular object. In some embodiments, robots 110 may devote additional time and resources to correct their positioning relative to the misalignment before attempting to retrieve the particular object. In some other embodiments, robots 110 may be unable to interact with the particular object because of the misalignment, and may report the anomaly instead of completing the task or after completing the task.

Robots 110 may share (at 5 and 8) the anomaly with one another or with a central coordinator. Robots 110 may additionally share (at 5 and 8) the expected and actual kinematics associated with the anomaly and/or task with one another or with the central coordinator.

Based on the shared information, robots 110 and/or the central coordinator may determine that at least two different robots 110 experienced the same anomaly when using environment elements 310 and/or 320. Accordingly, the root cause of the anomalies may be traced to the misalignment of environment elements 310 and 320. Rather than adjust internal sensors or actuators of robots 110, robot 110-2 may be tasked (at 9) with adjusting a position of the particular object in order to correct for the misalignment of environment element 320 (of the particular object) with environment element 310.

The environment elements may include any element within the environment that is not part of one of the robots, that is not controlled by one of the robots, and/or that the robots rely on or use in the performance of a task. Accordingly, the environment elements may include identifiers for objects, identifiers for locations, identifiers for dimensions, identifiers that provide instructions, reference points, wireless beacons or signaling, and/or other detectable features, signaling, or messaging. The environment elements may also include physical objects that the robots interact with, manipulate, and/or otherwise rely on or use.

In some embodiments, environmental anomalies may also be detected using the probabilistic models that are generated for each robot sensor and actuator. For instance, if a robot detects an anomaly, and the probabilistic models for each sensor and actuator reveal a very low likelihood of the anomaly being due to a failure or unexpected operation of any sensor or actuator, then the robot may classify the anomaly as an environmental anomaly. In some such embodiments, the robot may rely on the kinematics of other robotics to confirm that the error is an environmental anomaly.

For instance, a robot may be tasked with traveling 5 feet, and an anomaly may be detected when the actual kinematics that result from activations and controls defined by the expected kinematics do not provide the 5 feet of movement. The expected kinematics may define 1 foot of movement for every wheel rotation, and the probabilistic models may specify a 0.1% chance of unexpected behavior due to a newly installed drive motor, a 0.1% chance of unexpected behavior due to newly replaced tires, and a 0.1% chance of unexpected behavior due to recently calibrated sensors used to move the robot. In this example, the probabilistic models yield a statistically low probability that the anomaly is an individualized anomaly. Accordingly, the anomaly may be classified as an environmental anomaly, and the robot may then attempt to identify and correct the environment element that creates the environmental anomaly.

Figure 4:
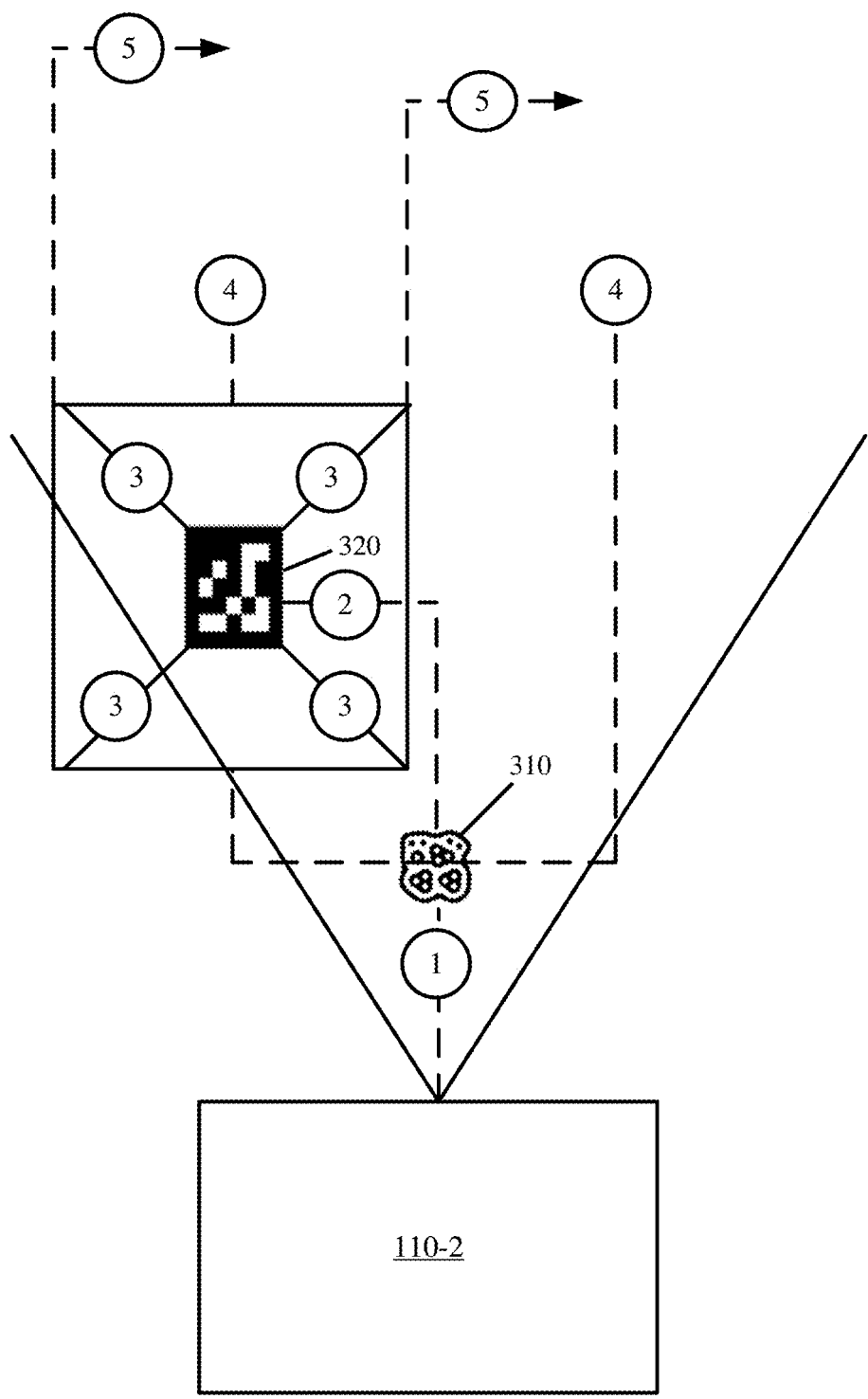
FIG. 4 illustrates an example of a robot adjusting an environment element to correct for a detected environmental anomaly in accordance with some embodiments described herein.

FIG. 4 illustrates an example of robot 110-2 adjusting an environment element to correct for a detected environmental anomaly in accordance with some embodiments described herein. In this figure, the environmental anomaly may be due to a misplaced first object. The misplacement of the first object may prevent robots 110 from correctly interacting with the first object or may cause damage to the first object when robots 110 interact with the first object. The misplacement of the first object may also create a cascade of other anomalies. For instance, the misalignment of the first object may block or otherwise obstruct access to an adjacent space for a second object, thereby preventing robots 110 from placing a second object into the adjacent space or otherwise interacting with the second object or the adjacent space.

As was shown in FIG. 3 and is shown in FIG. 4, robot 110-2 may correctly arrive at environment element 310. The particular object, that is identified by environment element 320, is expected to be based at the location identified by environment element 310. Robot 110-2 may determine that is arrived at the correct location (e.g., location identified by environment element 310) based on the expected kinematics and the actual kinematics for moving robot 110-2 before environment element 310 matching, and robot 110-2 detecting (at 1), via a sensor (e.g., a camera), environment element 310 after the activations and controls resulting from the actual kinematics.

Robot 110-2 may detect that the anomaly is an environmental anomaly based on the same anomaly being experienced by another robot. In particular, robot 110-2 may detect the environmental anomaly in response to detecting (at 2) that environment element 320 is not aligned with environment element 310, and based on at least one other robot experiencing the same or similar error when relying on or using environment elements 310 and 320.

To correct the misaligned environment element 320, and thereby correct the misplacement of the particular object, robot 110-2 may use one or more sensors and actuators to locate (at 2) environment element 320 relative to environment element 310. For instance, a camera of robot 110-2 may image environment element 320 in the same frame as environment element 310, although environment element 320 may be offset from environment element 310 in the image. In some embodiments, robot 110-2 may increase its distance from environment element 310 in order to increase the camera's field of view so that environment element 320 eventually falls in the field of view. Alternatively, robot 110-2 may move itself or the camera to the right and left of environment element 310 in order to detect the position of environment element 320. If environment element 320 cannot be detected within a specified distance from environment element 310, robot 110-2 may generate a message to indicate that environment element 320 is missing and/or that the particular object is no longer located at or near the expected position.

In response to imaging environment element 320 at a misaligned or unexpected position, robot 110-2 may determine (at 3), from environment element 320, the boundaries of the corresponding particular object identified by environment element 320, and/or the physical volume consumed by the particular object. For instance, robot 110-2 may use environment element 320 to query for and obtain dimensions of the particular object identified by environment element 320. The identifier may be located at a particular position on the particular object (e.g., in the center of the particular object) such that robot 110-2 may extrapolate (at 3) the boundaries, edges, or shape of the particular object from the position of environment element 320. In some embodiments, robot 110-2 may image the boundaries of the particular object as part of imaging environment element 320, and process the image to obtain the boundaries of the particular object rather than extrapolate the boundaries from environment element 320.

Robot 110-2 may determine (at 4) the boundaries for the expected positioning of the particular object and environment element 320 of the particular object based on the imaging of environment element 310 corresponding to the expected location for the particular object. Robot 110-2 may compare the extrapolated boundaries of the particular object to the extrapolated boundaries for the expected location of the particular object (e.g., both of which are determined from an imaged position of environment element 320 relative to the imaged position of environment element 310).

Based on the comparison, robot 110-2 may detect that the extrapolated boundaries, edges, or shape of the particular object cross into the space allocated for another object, and/or are misaligned relative to the expected position identified by environment element 310. Robot 110-2 may further compute (at 5) the misalignment of the particular object. In particular, robot 110-2 may compute movements of the particular object that align environment element 320 of the particular object with environment element 310 identifying the expected position of the particular object.

Robot 110-2 may adjust the position of the particular object according to the computed movements determined from environment elements 310 and/or 320. By adjusting the position of the particular object, robot 110-2 adjusts the position of environment element 320. In particular, robot 110-2 aligns environment element 320 with the position of environment element 310 in order to correct the environmental anomaly that affects all robots that attempt to interact with the particular object. The adjusted position places the particular object in the corresponding space that is allocated for that object, prevents the particular object from obstructing access to space that is allocated for other objects, and allows for aligned retrieval of the particular object upon a robot correctly arriving before environment element 310.

The adjustments made to the positioning of the particular object may include adjusting a horizontal or vertical position of the particular object. The adjustments may further include correcting for skew, rotation, or other movement of the particular object. In some embodiments, adjusting environment element 320 may include physical movements of environment element 320 or the object that presents environment element 320.

Other adjustments for correcting other environmental anomalies may include tuning a signal issued by an environment element that produces an environmental anomaly, or reconfiguring an environment element that produces an environmental anomaly. For instance, robot 110-2 may arrive before environment element 310, and may determine, via a wireless radio or other sensor, that a signal issued by environment element 320 has incorrect characteristics (e.g., insufficient signal strength). Accordingly, robot 110-2 may either adjust a position of a beacon associated with environment element 320, or may wireless reconfigure the beacon to provide the signal with the correct characteristics.

Figure 5:
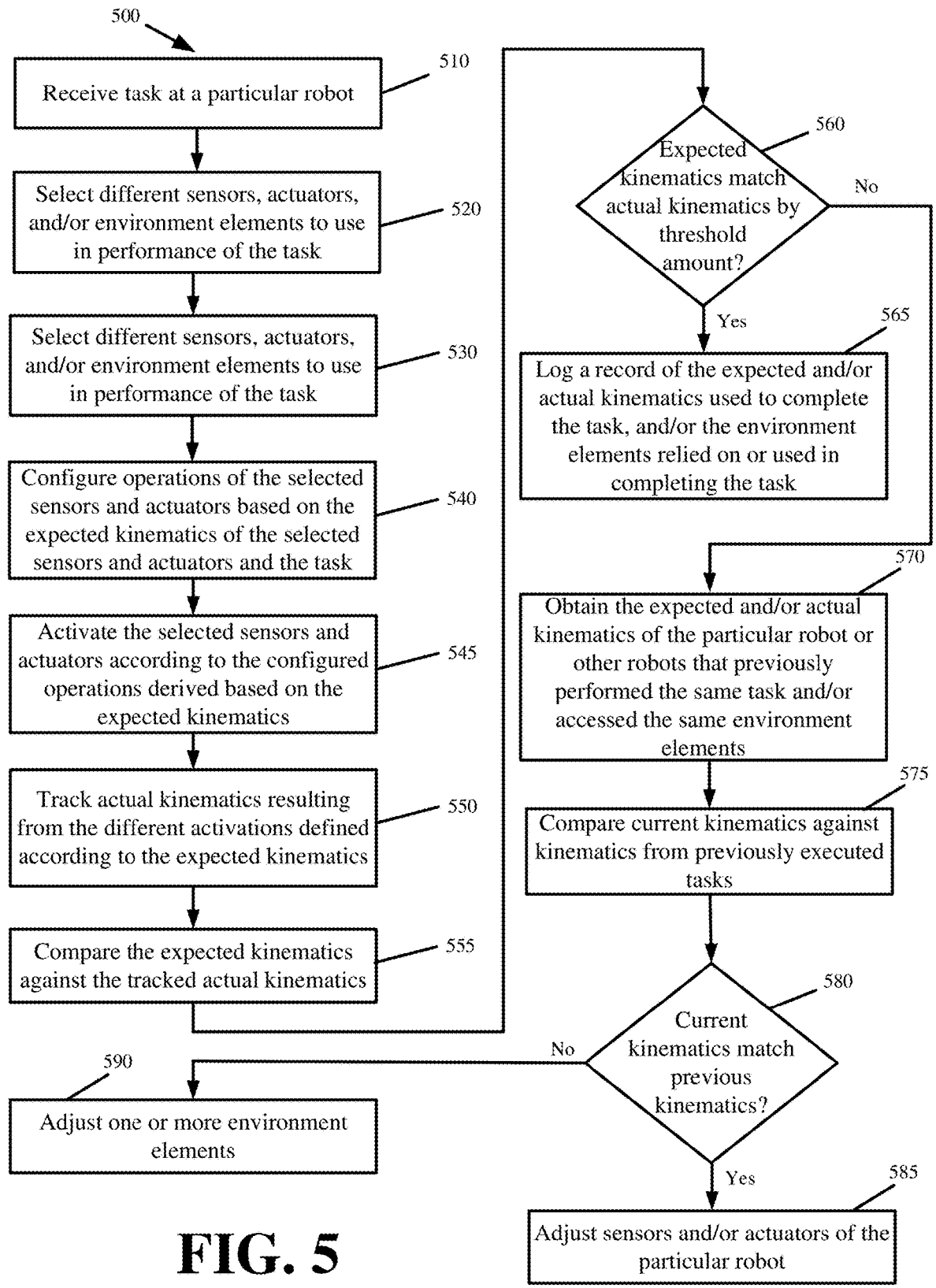
FIG. 5 presents a process for autonomously detecting and differentiating between individualized anomalies and environmental anomalies with a distributed set of robots in accordance with some embodiments presented herein.

FIG. 5 presents a process 500 for autonomously detecting and differentiating between individualized anomalies and environmental anomalies with a distributed set of robots in accordance with some embodiments presented herein. Process 500 may be performed by a collective set of robots, that operate in a common environment in conjunction with or independent of a central coordinator, that controls operation of the set of robots and has access to the sensors and actuators of the collective set of robots.

As previously defined, an individualized anomaly may be an anomaly that is experienced by a single robot because of incorrect, unexpected, and/or misconfigured operation of one or more sensors or actuators of that robot. An environmental anomaly may be an anomaly that is experienced by two or more robots because of incorrect, unexpected, and/or misconfigured information from one or more environment elements relied on or used by the two or more robots in performing the same or different tasks.

Process 500 may include receiving (at 510) a task at a particular robot of the collective set of robots, and selecting (at 520) different sensors, actuators, and/or environment elements to use in performance of the task. The particular robot may be programmed with routines that specify the sensors, actuators, and/or environment elements to use in performance of different tasks. For instance, a task to move the particular robot to a destination may involve a routine that activates two drive motors for two wheels of the particular robot, and a camera of the particular robot to scan environment elements along the path. The particular robot may be configured with a map from which the particular robot determines the environment elements to expect when traversing the path. In some embodiments, the task may specify the environment elements that the particular robot should expect and/or use in performing the task. The task may specify conditions associated with execution of the task. For instance, the task may specify a time and/or speed with which the particular robot is to complete the task. The task may also specify certain paths and/or resources that the particular robot may or may not access in the completion of the task. The particular robot may select the environment elements that are associated with the paths and/or resources that the particular robot may access in the completion of the task.

Process 500 may include determining (at 530) the expected kinematics with which the particular robot may complete the task using the selected set of sensors and actuators in conformance with any path, resources, and/or other restrictions specified as part of the task. The expected kinematics may specify the calibrated, configured, or expected operations of the sensors and actuators from which the particular robot may determine an expected set of activations and/or controls of the selected sensors and actuators that can perform the task in a specified manner. Accordingly, process 500 may include configuring (at 540) the operations of the selected sensors and actuators based on the expected kinematics of the selected sensors and actuators and based on the task to perform. For instance, configuring (at 540) the operations may include computing the amount of power to supply to each actuator, when to power each actuator, the duration to power each actuator, the commands to supply to each actuator, and/or when to supply the commands to each actuator based on the expected kinematics associated with each actuator and/or each operation performed by each actuator. The configuration (at 540) may specify similar control of the selected sensors based on the expected kinematics of each sensor and/or each operation performed by each sensor.

Process 500 may include activating (at 545) the selected sensors and actuators of the particular robot in completion of the task according to the configured operations derived based on the expected kinematics of the particular robot. Process 500 thereby includes controlling the particular robot in the manner prescribed by the operations configured according to the expected kinematics of the particular robot's sensors and actuators.

While executing the task, process 500 may include tracking (at 550) the actual kinematics of the particular robot resulting from the different activations of the robot sensors and actuators that are defined according to the expected kinematics of the sensors and actuators. Tracking (at 550) the actual kinematics may include using one or more sensors, actuators, and environment elements to monitor actual movements and operations of the particular robot. For instance, the particular robot may use one or more sensors and/or environment elements to determine if the particular robot has moved to a certain location, has moved a certain distance, has performed a set of movements, or has performed other operations.

Process 500 may include performing anomaly detection in the course of or after performing the operations related to execution of the received task. The anomaly detection may include comparing (at 555) the expected kinematics, that are used to configure (at 540) the operation of the selected sensors and actuators, against the tracked (at 550) actual kinematics, that result from operating the particular robots according to the activations and controls defined from the expected kinematics. The anomaly detection may further include determining (at 560), based on the comparison (at 555), if the expected kinematics match the actual kinematics or if the expected kinematics deviate by some threshold amount from the actual kinematics.

A match may indicate that the particular robot did not encounter any unexpected deviations or anomalies in using its sensors and actuators and in relying on or using one or more environment elements to successfully execute the task. In other words, the sensors and actuators of the particular robot performed as expected, and/or the particular robot completed a set of movements and operations in relation to one or more environment elements in an expected manner.

The received task may include various objectives. For instance, moving the particular robot from a current location to a destination may include accelerating the particular robot to a specific speed, decelerating to turn, turning, avoiding obstacles, and/or other sub-objectives. The task is successfully executed if each objective of the task is completed without a threshold amount of deviation between the actual kinematics and the expected kinematics, and if environment elements can be used to confirm that the actual kinematics successfully completed the task.

In response to determining (at 560—Yes) that the expected kinematics match the actual kinematics, process 500 may conclude that the particular robot performed as expected and successfully performed the task. In this case, process 500 may include logging (at 565) a record of the expected and/or actual kinematics used to complete the task, and/or the environment elements relied on or used in completing the task. The record may be shared with other robots or the central coordinator for subsequent differentiation between individualized anomalies and environmental anomalies. Process 500 may be restarted by assigning a new task to the particular robot.

In response to determining (at 560—No) that the expected kinematics did not match the actual kinematics or deviated from the actual kinematics by the threshold amount, process 500 may conclude that the particular robot experienced an anomaly in the execution of the task. The mismatch between the expected kinematics and the actual kinematics of the particular robot may be the result of an individualized anomaly stemming from one or more of the particular robot's sensors or actuators operating in an unexpected manner, or may be the result of an environmental anomaly stemming from one or more environment elements that have changed from an expected state and that produced one or more deviations in the tracking of the particular robot's actual kinematics.

Accordingly, in response to determining (at 560—No) that the expected kinematics did not match the actual kinematics by the threshold amount, process 500 attempts to determine the cause of the anomaly. To determine the cause of the anomaly, process 500 may include obtaining (at 570) the expected and/or actual kinematics of the particular robot and/or other robots that previously performed the same task, and that accessed the same environment elements in performance of other similar tasks. For instance, the particular robot may have logged (at 565) the expected and/or actual kinematics for the last time the particular robot performed a task using the same environment elements, and may obtain (at 570) these values. Alternatively, the particular robot may query for and receive the logged kinematics from one or more other robots that performed the same or similar tasks using the same environment elements whether or not the other robots successfully completed the task or experienced an anomaly.

Process 500 may include comparing (at 575) the expected and/or actual kinematics of the particular robot that resulted in the present anomaly with the expected and/or actual kinematics from the same or other robots performing the same or similar task and/or accessing the same environment elements in the performance of a prior task. In some embodiments, the kinematics are provided to a central coordinator that may perform the comparison (at 575) on behalf of the robots. In some embodiments, the comparison (at 575) may include performing a Bayesian model comparison or a statistical comparison using the expected and/or actual kinematics of different robots performing the same or similar tasks or accessing the same environment elements in the performance of those tasks.

Based on comparing the current kinematics against the kinematics from prior execution of the same or similar task, process 500 may include determining (at 580) whether the anomaly is an individualized anomaly affecting only the particular robot, or an environmental anomaly affecting multiple robots. The determination (at 580) may be based on detecting some threshold amount of deviation between the current kinematics (e.g., expected and/or actual kinematics of the particular robot detecting the anomaly) against the previous kinematics (e.g., expected and/or actual kinematics of the particular robot or another robot previously performing the same or similar task and/or relying on the same environment elements in the performance of a task).

Figure 6:
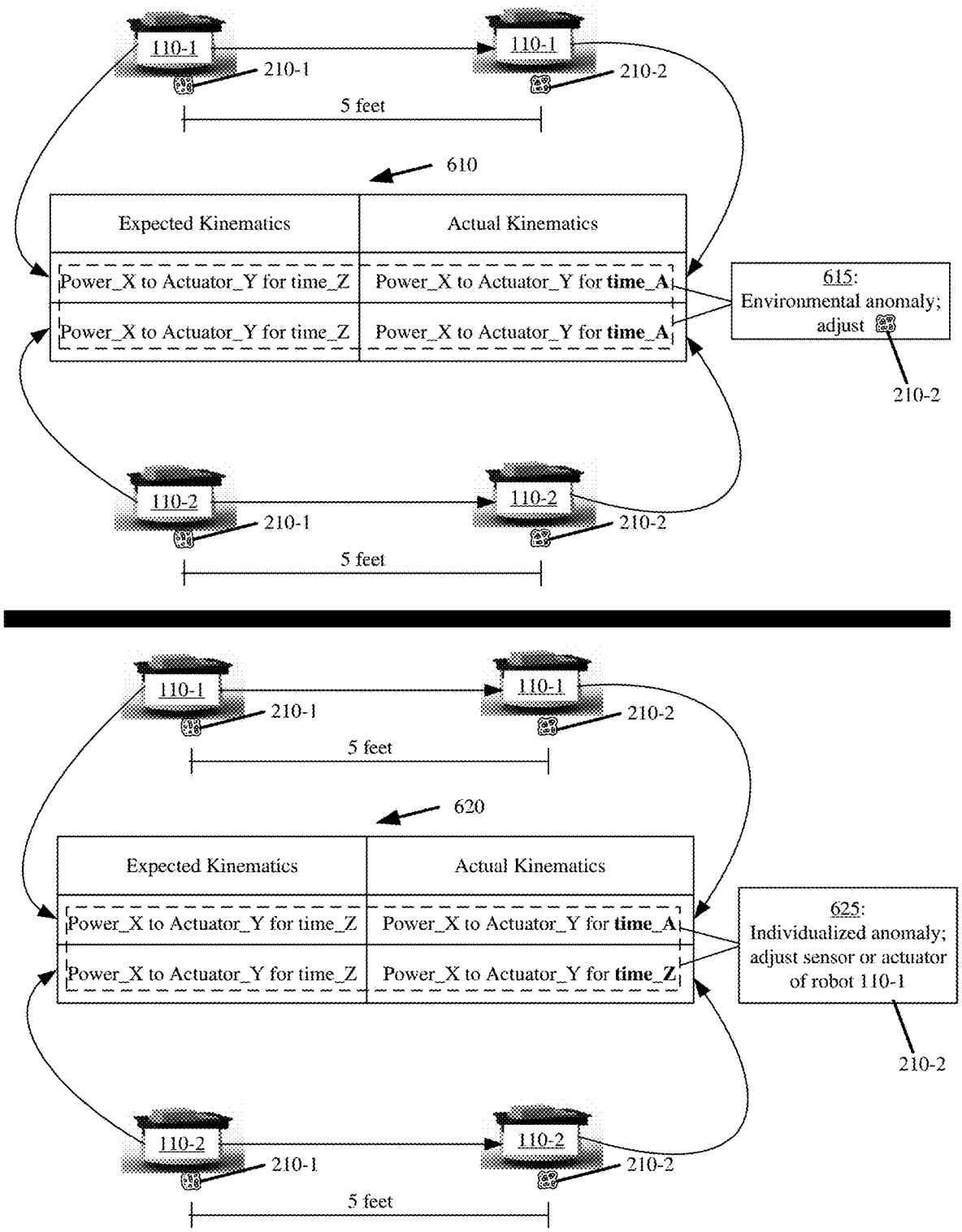
FIG. 6 illustrates an example of differentiating between an individualized anomaly and an environmental anomaly in accordance with some embodiments described herein.

FIG. 6 illustrates an example of differentiating between an individualized anomaly and an environmental anomaly in accordance with some embodiments described herein. FIG. 6 includes comparisons 610 and 620 of different sets of kinematics that lead to identification of an individualized anomaly and an environmental anomaly. In particular, first robot 110-1 may detect an anomaly in traveling 5 feet from first environment element 210-1 to second environment element 210-2 as a result of the expected kinematics and actual kinematics of first robot 110-1 being mismatched by at least a threshold amount in completion of the task. First robot 110-1 may then compare its kinematics with a different set kinematics to determine if the anomaly is an individualized anomaly or an environmental anomaly.

FIG. 6 presents first comparison 610 of a first set of expected kinematics and actual kinematics for first robot 110-1 and second robot 110-2 performing the task at different times. The first set of expected kinematics for both first robot 110-1 and second robot 110-2 specify providing a first amount of power to a first actuator for a first amount of time to move the 5 feet of distance between first and second environment elements 210-1 and 210-2. The first set of actual kinematics for both first robot 110-1 and second robot 110-2 track providing the first amount power to the first actuator for a different second amount of time to move the 5 feet of distance between first and second environment elements 210-1 and 210-2. In this case, the anomaly may be classified as an environmental anomaly 615 since two different robots 110-1 and 110-2 experienced a similar sensor and/or actuator deviation in the performance of a task when referencing first and second environment elements 210-1 and 210-2. In other words, since both robots 110-1 and 110-2 experienced the same anomaly, the anomaly may be due to an unexpected environment element (e.g., misplacing second environment element 210-2 relative to first environment element 210-1). Accordingly, first robot 110-1 may remediate environmental anomaly 615 by adjusting second environment element 210-2.

FIG. 6 also presents second comparison 620 of a different second set of expected kinematics and actual kinematics for first robot 110-1 and second robot 110-2 performing the task at different times. The second set of expected kinematics for both first robot 110-1 and second robot 110-2 again specify providing the first amount of power to the first actuator for the first amount of time to move the 5 feet of distance between first and second environment elements 210-1 and 210-2. However, the second set of actual kinematics for first robot 110-1 are mismatched, whereas the second set of actual kinematics for second robot 110-2 match.

As shown in FIG. 6, the second set of actual kinematics for first robot 110-1 tracks providing the first amount power to the first actuator for the second amount of time, whereas the second set of actual kinematics for second robot 110-2 tracks providing the first amount power to the first actuator for the first amount of time. In this example, since second robot 110-2 operates as expected and therefore does not experience an anomaly while moving the 5 feet of distance between first and second environment elements 210-1 and 210-2, first robot 110-1 may determine, based on second comparison 620, that the anomaly is an individualized anomaly 625. More specifically, individualized anomaly 625 is the result of unexpected behavior from one or more sensors and actuators of first robot 110-1. Accordingly, first robot 110-1 may remediate individualized anomaly 625 by adjusting the one or more sensors and actuators.

With reference back to FIG. 5, process 500 may also use the probabilistic models, that are generated for each sensor or actuator of a robot, to aid in determining whether an anomaly is an individualized anomaly or an environmental anomaly. For instance, an individualized anomaly may be detected when the probability of unexpected behavior from one or more sensors or actuators relied on by a robot for completion of a task is sufficiently high, and an environmental anomaly may be detected when the probability of unexpected behavior from one or more sensors or actuators relied on by a robot for completion of a task is sufficiently low.

In response to determining (at 580—Yes) that the anomaly is an individualized anomaly that is experienced by the particular robot and not other robots, process 500 may include adjusting (at 585) one or more sensors or actuators of the particular robot that caused the deviation between the expected and actual kinematics. Adjusting (at 585) the sensors or actuators may include detecting which sensors and/or actuators of the particular robot caused the deviation between the expected and actual kinematics based on the probabilistic models of each sensor and actuator, and/or further based on using different sensors and actuators to verify the unexpected behavior of other sensors and actuators. In some embodiments, the particular robot may run diagnostics or a recalibration routine on one or more sensors and actuators with high probabilities of unexpected behavior to confirm if those sensors and actuators are operating unexpectedly. Adjusting (at 585) the sensors or actuators may further include recalibrating, reconfiguring, repositioning, changing operation, and/or other changing behavior of the sensors or actuators detected to be the cause of the individualized anomaly.

In some embodiments, the robots may be unable to correct certain individualized anomalies because of a component that has failed or cannot be adjusted by the robot. In some such embodiments, the affected robot may remove itself from further operations, may report the anomalies and/or failures to a system coordinator, and may move to a repair station.

In response to determining (at 580—No) that the anomaly was not individualized and was experienced by multiple robots (e.g., an environmental anomaly), process 500 may include adjusting (at 590) one or more environment elements that caused the operation of multiple robots to fail. Adjusting (at 590) an environment element may include detecting which environment element, that is relied on or used in the performance of a task, produces the anomaly, and correcting that environment element. The correction may include repositioning the environment element to be in an expected location or in an expecting orientation, and/or reporting the anomaly to a system coordinator. The correction may also include reconfiguring or otherwise adjusting the environment element.

In some embodiments, after the remediating actions (at 585 or 590), the particular robot may log a report of the expected and/or actual kinematics that were associated with the detected anomaly. The logged kinematics may be shared with other robots or the central coordinator.

Figure 7:
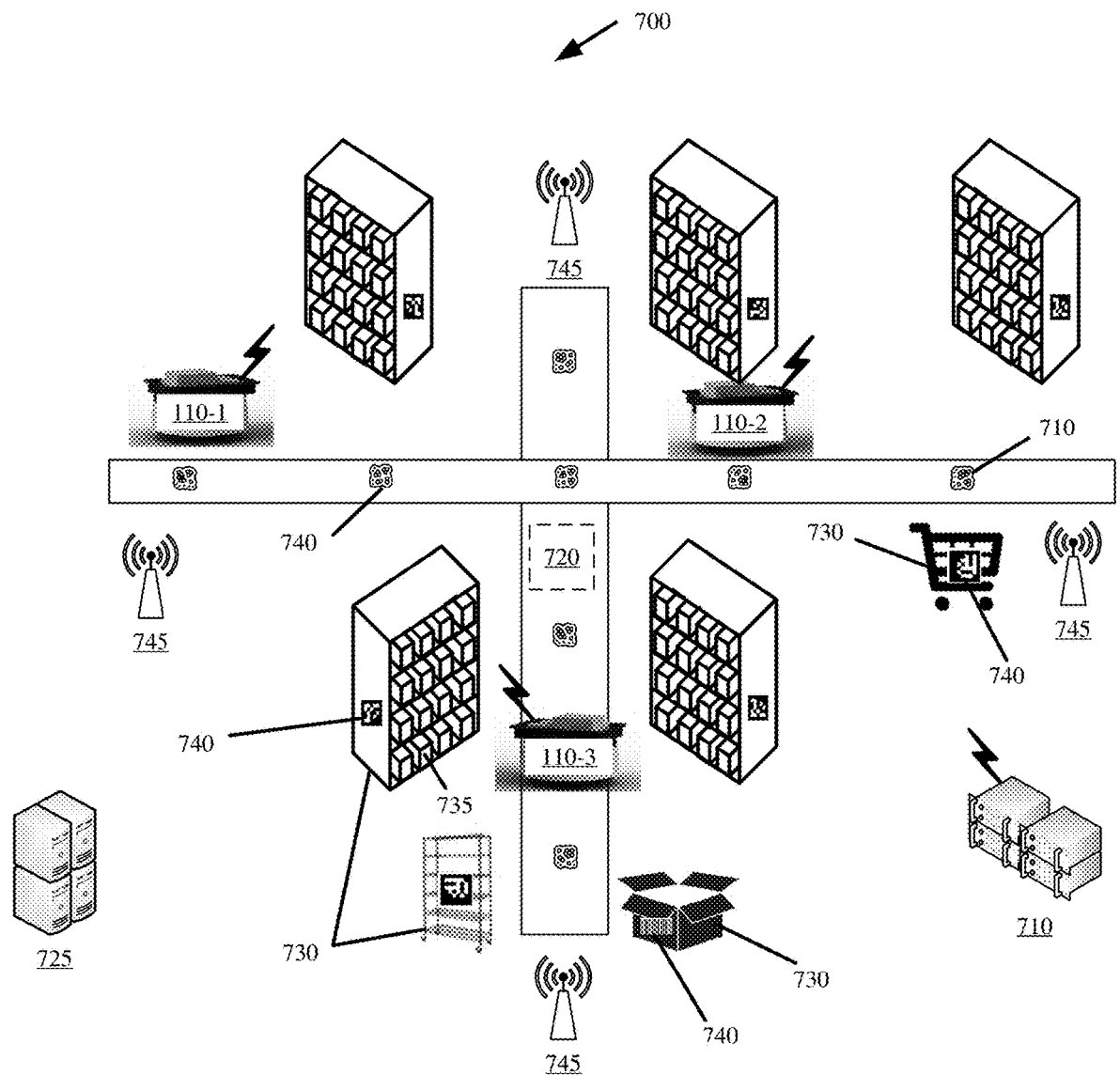
FIG. 7 illustrates an example environment from which a distributed set of robots detect individualized and environmental anomalies in accordance with some embodiments described herein.

FIG. 7 illustrates an example environment 700 from which a distributed set of robots detect individualized and environmental anomalies in accordance with some embodiments described herein. Environment 700 may include a site with two or more robots 110, resources, objects, environment elements, and central coordinator 710.

Robots 110 may operate within the site or space to execute various tasks. Robots 110 may include autonomous machines that can operate without human involvement or interaction to perform tasks such as object retrieval, object transfer, order fulfillment, inventory management, operations involving the usage of the resources, and/or other operations involving the physical manipulation of the objects. Robots 110 may include various sensors and actuators to access, manipulate, and/or otherwise interact with the resources and objects of environment 700. Robots 110 may access the same resources at different times or may interact with the same objects at the same or different times in executing different tasks.

As shown in FIG. 7, the resources may include space 720, shared computing power 725, and/or other assets that robots 110 use apart from their own sensors and actuators to execute various tasks. The objects may include storage apparatus 730, items 735, and/or other physical matter that robots 110 may interact with or use in the execution of different tasks.

Environment 700 may further include different environment elements that robots 110 may rely on or use in the execution of their tasks. As previously noted, robots 110 may rely on the environment elements to verify movements and/or operations. In some embodiments, the environment elements can be points of reference used by robots 110 to track the actual kinematics of the robots 110. Accordingly, the environment elements may include different identifiers 740 (e.g., fiducials, visual markers, salient queues, barcodes, etc.) or beacons 745 that robots 110 may reference with cameras or other sensors to determine how far the robot has moved, the height of the robot, the orientation of the robot relative to an environment element, if the robot is at a correct location, if the robot is traveling at a correct speed, if the robot is interacting with a correct resource or object, where the robot is to perform turns or other maneuvers, etc. In other words, robots 110 may detect and/or read the environment elements to obtain information about their positioning, direction, orientation, speed, and/or other operational parameters as well as obtain information about different objects and resources of environment 700. Beacon 745 may use light, sound, network messages, and/or other signaling to convey information to robots 110.

An environmental anomaly may occur if an identifier 740 is moved from an expected location or is misplaced, or if a beacon 745 omits incorrect signaling or messaging. In this case, every robot 110 that relies on or uses the moved identifier 740 in the execution of a task may receive incorrect information, thereby leading to a mismatch between the expected and actual kinematics of the robot. A misplaced identifier 740 may be due to a misplaced object. In this case, robots 110 may expect to be in a correct location to retrieve an object based on the comparison of the robot's kinematics, but if the object is misplaced, the robot may be unable to detect the corresponding identifier 740 for that object, and may be unable to retrieve the object.

Central coordinator 710 may wirelessly communicate with robots 110. In some embodiments, central coordinator 710 may receive the expected kinematics and tracked actual kinematics from each robot 110 that performs a task, and central coordinator 710 may detect anomalies on behalf of robots 110 based on the aggregated kinematics. In some embodiments, central coordinator 710 may assign different tasks to robots 110, may control the activations of the sensors and actuators of robots 110, and may direct robots 110 in correcting for detected individualized anomalies and environmental anomalies. In some other embodiments, central coordinator 710 may assign the tasks to robots 110, and robots 110 may share kinematics with one another to detect different anomalies, and to correct the anomalies. Central coordinator 710 may include one or more devices with wireless connectivity and at least one processor.

Figure 8:
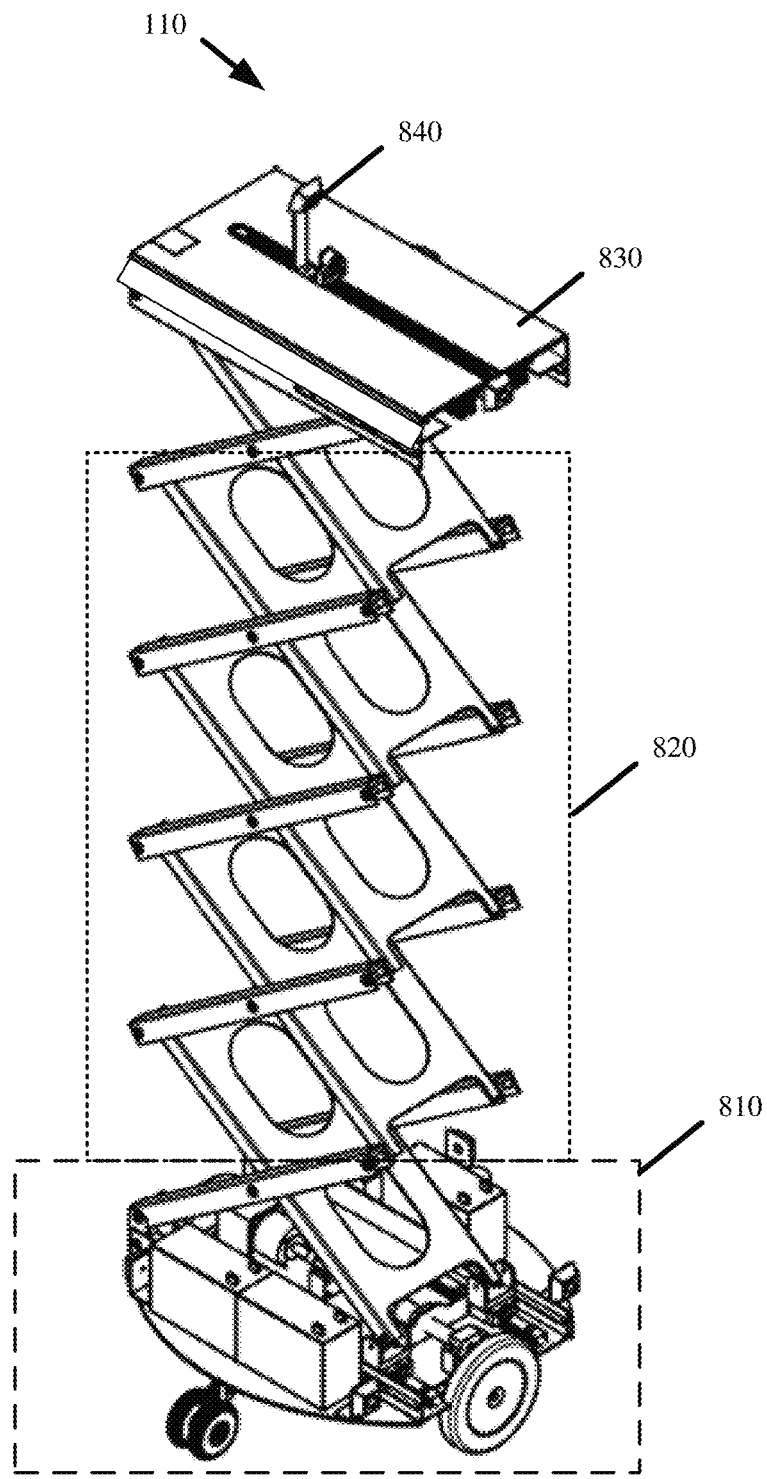
FIG. 8 illustrates some of the sensors and actuators of an example robot in accordance with some embodiments presented herein.

FIG. 8 illustrates some of the sensors and actuators of an example robot 110 in accordance with some embodiments presented herein. Robot 110 may include motorized base 810 that powers locomotion or movement of robot 110 in three-dimensional space. Motorized base 810 may have one or more sensors and actuators including, for example, one or more drive motors, wheel encoders, gyroscopes, accelerometers, inertial sensors, scanners, LIDAR, wireless radios, and cameras. Motorized base 810 may further include batteries, processors, wheels, and/or other components used to operate robot 110. In some embodiments, motorized base 810 may include other actuators including articulating legs, propellers, tracks, or other means of locomotion besides the illustrated wheels.

Atop and/or attached to motorized base 810 may be additional actuators such as lift 820. Lift 820 may raise and lower platform 830. As shown, lift 820 may include a collapsing and expanding structure. In some embodiments, lift 820 may include a pneumatic piston or other means for raising and lowering platform 830.

Platform 830 may include an elongated surface onto which objects retrieved by robot 110 may be retained during transport. Platform 830 may also include mechanical retriever 840 with one or more actuators and/or sensors for retrieving objects onto platform 830.

Mechanical retriever 840 may include at least one motor or actuator for moving mechanical retriever 840 across the surface of platform 830 in order to engage an object and then pull the object onto platform 830. Mechanical retriever 840 may include one or more retrieval elements. The retrieval element may include a vacuum that uses suction to engage containers and/or other objects. The retrieval element may alternatively include a gripper, articulating mechanical arm, or other actuators to grab or otherwise engage containers and/or objects.

One or more sensors about platform 830 or mechanical retriever 840 may be used to determine a height of platform 830, alignment and/or other positioning of mechanical retrieval 840 relative to an object. The one or more sensors about platform 830 or mechanical retriever 840 may include cameras, scanners, readers, depth sensors (to detect distance between mechanical retriever 850 and an object), load sensors (or weight sensors to determine force for moving an object), and/or force sensors (to detect contact with an object).

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving a task at a first robot;
   determining expected kinematics of the first robot for executing the task, wherein the expected kinematics comprise expected activations of a set of sensors and actuators by which the first robot is to execute the task based on past tracked performance of the set of sensors and actuators;
   activating the set of sensors and actuators according to the expected kinematics;
   tracking actual kinematics of the first robot while activating the set of sensors and actuators according to the expected kinematics and continuing the activations until detecting one or more environment elements signaling completion of the task;
   detecting an anomaly based on the expected kinematics determined to execute the task deviating by at least a threshold amount from the actual kinematics tracked in executing the task;
   comparing the expected kinematics and the actual kinematics used by the first robot for execution of the task against expected kinematics and actual kinematics of a second robot that references the one or more environment elements in completing the task or another task;
   classifying the anomaly as:
     a first anomaly that is particular to the first robot and that does not affect the second robot in response to the expected kinematics of the first robot deviating from the actual kinematics of the first robot by the threshold amount and the expected kinematics of the second robot not deviating from the actual kinematics of the second robot by the threshold amount, and
     a second anomaly that affects two or more robots in response to the expected kinematics of the first robot deviating from the actual kinematics of the first robot by the threshold amount and the expected kinematics of the second robot deviating from the actual kinematics of the second robot by the threshold amount;
   adjusting one of the set of sensors and actuators of the first robot in response to classifying the anomaly as the first anomaly; and
   adjusting at least one of the one or more environment elements that exist separate from the first robot without adjusting the set of sensors and actuators of the first robot in response to classifying the anomaly as the second anomaly.

2. The method of claim 1, wherein adjusting one of the set of sensors and actuators comprises:
   selecting a particular sensor or actuator from the set of sensors and actuators that performs unexpectedly; and
   modifying operations of the particular sensor or actuator based on the deviation between the actual kinematics and the expected kinematics of the first robot.

3. The method of claim 2, wherein the modifying comprises:
   performing a reconfiguration, recalibration, or repositioning of the particular sensor or actuator.

4. The method of claim 2, wherein adjusting the at least one of the one or more environment elements comprises:
   selecting a particular environment element from the one or more environment elements that provides unexpected information; and
   using one or more sensors and actuators of the first robot to reconfigure, recalibrate, or reposition the particular environment element based on the deviation between the actual kinematics and the expected kinematics of the first robot.

5. The method of claim 1 further comprising:
   detecting the one or more environment elements at different locations within a site using at least one of a camera, wireless radio, or other sensors of the set of sensors and actuators.

6. The method of claim 1, wherein determining the expected kinematics comprises:
   selecting the set of sensors and actuators from a plurality of available sensors and actuators of the first robot based on a set of operations involved in completing the task; and
   computing the expected activations with which the first robot completes the set of operations based on a prior calibration of the set of sensors and actuators, the prior calibration specifying expected operation execution of each sensor and actuator of the set of sensors and actuators.

7. The method of claim 1, wherein adjusting the at least one of the one or more environment elements comprises:
   detecting a particular environment element that is misplaced relative to an expected position;
   engaging an object associated with the particular environment element using an actuator of the first robot; and repositioning the object to align the particular environment element relative to the expected position.

8. The method of claim 1 further comprising:
distributing the expected kinematics and the actual kinematics from the first robot to at least one remote device or another robot aggregating expected kinematics and actual kinematics from other robots.

9. The method of claim 1 further comprising:
detecting an amount of deviation between the actual kinematics and the expected kinematics in response to detecting the one or more environment elements before completing each of the expected activations, or in response to detecting the one or more environment elements after additional activations in addition to the expected activations.

10. A robot comprising:
a plurality of sensors and actuators;
one or more processors configured to:
receive a task;
determine expected kinematics of the robot for executing the task, wherein the expected kinematics comprise expected activations of a set of the plurality of sensors and actuators by which the robot is to execute the task based on past tracked performance of the set of sensors and actuators;
activate the set of sensors and actuators according to the expected kinematics;
track actual kinematics of the robot while activating the set of sensors and actuators according to the expected kinematics and continuing the activations until detecting one or more environment elements signaling completion of the task;
detect an anomaly based on the expected kinematics determined to execute the task deviating by at least a threshold amount from the actual kinematics tracked in executing the task;
compare the expected kinematics and the actual kinematics used by the robot for execution of the task against expected kinematics and actual kinematics of a different second robot that references the one or more environment elements in completing the task or another task;
classify the anomaly as:
a first anomaly that is particular to the robot and that does not affect the second robot in response to the expected kinematics of the robot deviating from the actual kinematics of the robot by the threshold amount and the expected kinematics of the second robot not deviating from the actual kinematics of the second robot by the threshold amount, and
a second anomaly that affects two or more robots in response to the expected kinematics of the robot deviating from the actual kinematics of the robot by the threshold amount and the expected kinematics of the second robot deviating from the actual kinematics of the second robot by the threshold amount;
adjust one of the set of sensors and actuators in response to classifying the anomaly as the first anomaly; and
adjusting at least one of the one or more environment elements that exist separate from the robot without adjusting the set of sensors and actuators in response to classifying the anomaly as the second anomaly.

11. The robot of claim 10, wherein adjusting one of the set of sensors and actuators comprises:

selecting a particular sensor or actuator from the set of sensors and actuators that performs unexpectedly; and
modifying operations of the particular sensor or actuator based on the deviation between the actual kinematics and the expected kinematics of the robot.

12. The robot of claim 11, wherein modifying the operations comprises:
performing a reconfiguration, recalibration, or repositioning of the particular sensor or actuator.

13. The robot of claim 11, wherein adjusting the at least one of the one or more environment elements comprises:
selecting a particular environment element from the one or more environment elements that provides unexpected information; and
using one or more sensors and actuators of the robot to reconfigure, recalibrate, or reposition the particular environment element based on the deviation between the actual kinematics and the expected kinematics of the robot.

14. The robot of claim 10, wherein activating the set of sensors and actuators comprises:
collecting information from the one or more environment elements and one or more of plurality of actuators using the set of sensors and actuators; and
producing physical movements via activation of the set of sensors and actuators.

15. A non-transitory computer-readable medium, storing a set of processor-executable instructions, which, when executed by one or more processors, cause the one or more processors to:
receive a task;
determine expected kinematics of a first robot for executing the task, wherein the expected kinematics comprise expected activations of a set of sensors and actuators by which the first robot is to execute the task based on past tracked performance of the set of sensors and actuators;
activate the set of sensors and actuators according to the expected kinematics;
track actual kinematics of the robot while activating the set of sensors and actuators according to the expected kinematics and continuing the activations until detecting one or more environment elements signaling completion of the task;
detect an anomaly based on the expected kinematics determined to execute the task deviating by at least a threshold amount from the actual kinematics tracked in executing the task;
compare the expected kinematics and the actual kinematics used by the first robot for execution of the task against expected kinematics and actual kinematics of a second robot that references the one or more environment elements in completing the task or another task;
classify the anomaly as:
a first anomaly that is particular to the first robot and that does not affect the second robot in response to the expected kinematics of the first robot deviating from the actual kinematics of the first robot by the threshold amount and the expected kinematics of the second robot not deviating from the actual kinematics of the second robot by the threshold amount, and
a second anomaly that affects two or more robots in response to the expected kinematics of the first robot deviating from the actual kinematics of the first robot by the threshold amount and the expected kinematics of the second robot deviating from the actual kinematics of the second robot by the threshold amount;

adjust one of the set of sensors and actuators of the first robot in response to classifying the anomaly as the first anomaly; and adjusting at least one of the one or more environment elements that exist separate from the first robot without adjusting the set of sensors and actuators in response to classifying the anomaly as the second anomaly.

16. The method of claim 1, wherein adjusting the at least one of the one or more environment elements comprises:

moving an object or reference identifier from an unexpected location or an unexpected position in a site to an expected location or expected position in the site using the first robot, wherein the object comprises an item that the robots transfer within the site, and wherein the reference identifier comprises one or more of a visual marker, beacon, or salient queue with which the robots identify a specific location or a specific position within the site.

17. The method of claim 1 further comprising:

generating a probabilistic model with which each sensor or actuator of the set of sensors and actuators is expected to fail based on one or more of manufacturing tolerances, testing, historical performance, and age of each sensor or actuator.

18. The method of claim 17, where wherein adjusting one of the set of sensors and actuators comprises:

isolating the anomaly to a particular sensor or actuator of the set of sensors and actuators based on the probabilistic model generated for each sensor or actuator of the set of sensors and actuators; and modifying operation of the particular sensor or actuator in response to isolating the anomaly to the particular sensor or actuator.

19. The method of claim 17, wherein classifying the anomaly as the second anomaly is further in response to:

determining, from the probabilistic model generated for each sensor or actuator of the set of sensors and actuators, that a likelihood of one of the set of sensors and actuators experiencing a failure is less than a threshold amount.

20. The method claim 1, wherein adjusting one of the set of sensors and actuators comprises:

determining a particular actuator from the set of sensors and actuators as a more likely cause of the anomaly than other sensors or actuators of the first set of sensors and actuators based on probabilities of each sensor or actuator from the set of sensors and actuators failing; and modifying operation of the particular actuator in response to determining the particular actuator as the more likely cause of the anomaly.

* * * * *